INVENTOR
GEORGE J. KEYKO the outline of the letter D being vacant.

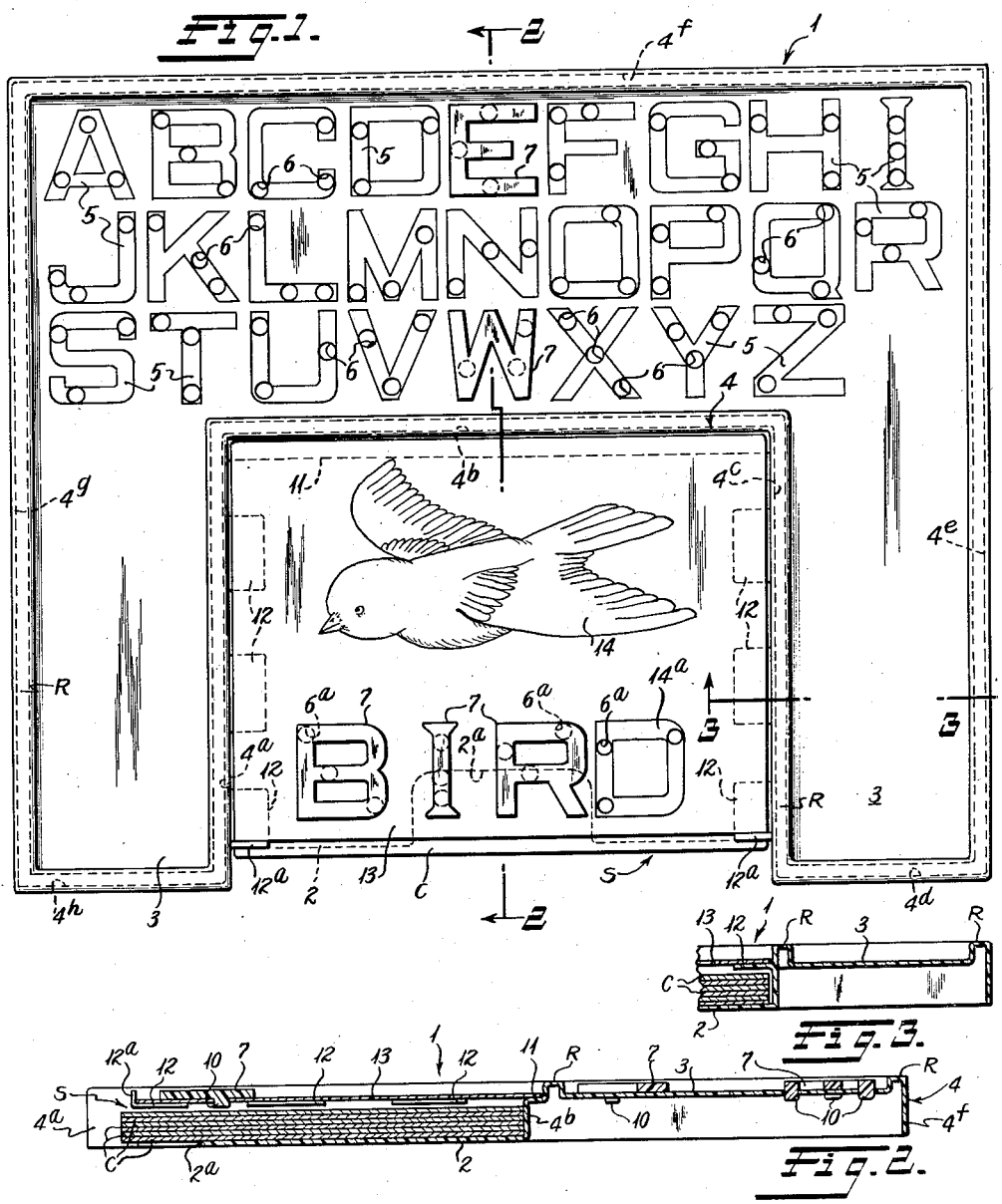

United States Patent Office 2,839,843
Patented June 24, 1958

2,839,843

EDUCATIONAL APPARATUS

George J. Keyko, Watertown, Conn., assignor to Teacher Toys, Inc., Hartford, Conn., a corporation of Connecticut Application January 18, 1955, Serial No. 482,473

5 Claims. (Cl. 35—35)

This invention relates to an educational device or apparatus primarily intended for teaching children the shape or outline of letters of the alphabet, the names of familiar objects, the spelling of the names of said objects, the shape or outline of numerals and the solution of simple problems in arithmetic.

One object of the invention is to provide apparatus including cards having pictorial representations of familiar objects or animals, together with outlines of the letters correctly spelling the names thereof, each letter of said names being adapted to receive and hold only a correspondingly shaped separate letter piece.

A further object of the invention resides in providing additionally, in one modification of the apparatus, cards each having a plurality of pictorial representations of objects or animals and a numerical representation, corresponding to the number of illustrations on a given card, and number pieces to be placed upon the cards in association with the pictorial representations.

Another object of the invention is to provide apparatus for teaching a child the solution to simple arithmetic problems through the use of cards having pictorial illustrations of objects and mathematical signs, together with pictorial illustrations of the same signs associated with numerals corresponding to the number of objects illustrated.

A still further object of the invention is to provide unique means for attaching characters in the shape of letter pieces and number pieces in the proper position on the cards, whereby only the proper letter piece and/or number piece will be received and held in each letter or number position of the names or numbers on the cards.

Another object of the invention resides in the provision of a novel educational device comprising a holder for the characters, i. e., the letters and/or numeral pieces and the cards having the pictures, names and/or numeral outline thereon.

Still another object is to provide a device of the character described which includes means for supporting a selected card in a manner to enable the letters and/or numerals to be conveniently placed thereon.

Other objects and advantages of the invention will be apparent from the following description taken in connection with the accompanying drawings, wherein:

Fig. 1 is a plan view of the holder showing the letter outlines on the holder with only the letters "E" and "W" thereon and with one of the cards in place thereon illustrating a bird with only three appropriate letter pieces, "B," "I" and "R" attached thereto;

Fig. 2 is a sectional view of the holder taken on line 2—2 of Fig. 1;

Fig. 3 is a fragmentary sectional view taken on the line 3—3 of Fig. 1;

Figs. 4, 5 and 6 are perspective views of three species of letter pieces that may be used as components of the apparatus;

Figure 7:
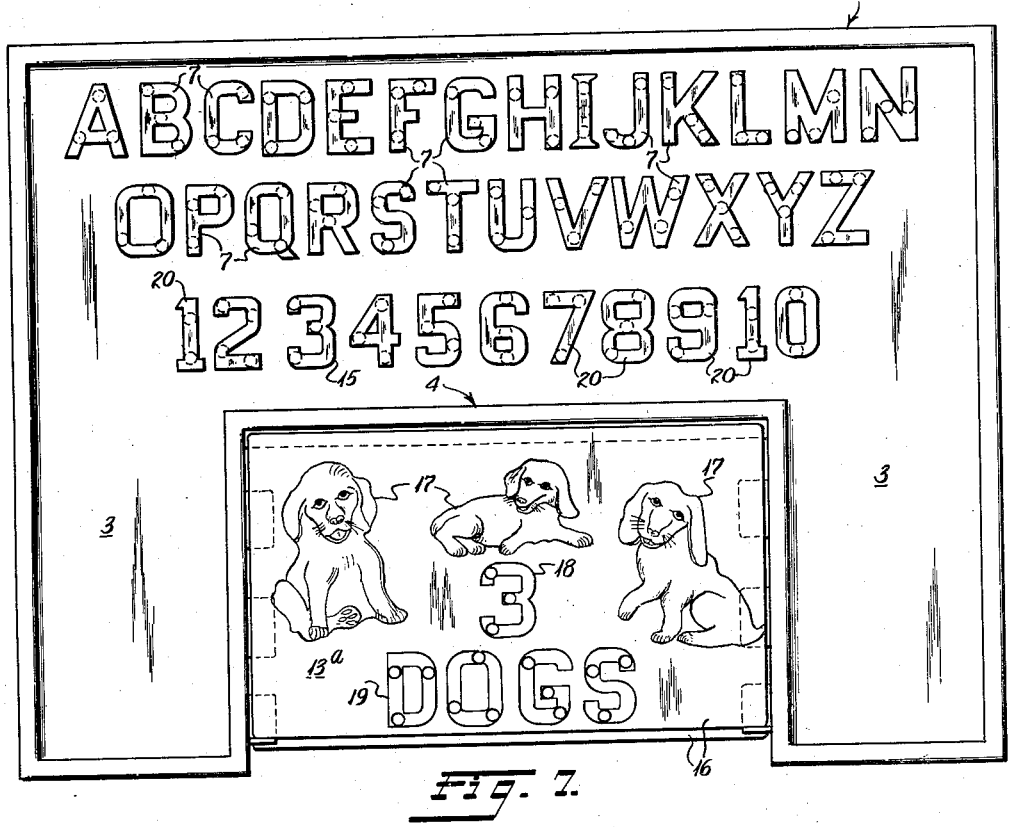
Fig. 7 is a plan view of another species of holder including letters and number pieces and an associated card illustrating three "Dogs" and the numeral "3"

In Figs. 1 to 3 of the drawings the holder is designated generally by the numeral 1. The holder, which may be made of a plastic material, sheet metal, wood or any suitable material, is of hollow form and consists of a lower wall 2 and a relatively large, parallel upper wall 3 connected thereto in spaced relation by a peripheral upstanding wall 4, including portions 4a, 4b, and 4c, which define a storage space S for cards C, as will be explained more fully hereinafter. The upstanding wall 4 includes portions 4d, 4e, 4f, 4g and 4h, which extend the remainder of the way around the holder 1. The upright wall portions 4a to 4h are connected to the horizontal wall 3 by a rim generally designated R and cooperating with the wall 3 to provide a shallow recess to retain on the holder any letter pieces which may be loosely resting thereon.

A portion of the area of the upper wall 3 has printed or otherwise inscribed thereon the outlines 5 of all of the letters of the alphabet. While only one alphabet is shown in the drawings, it is obvious that more than one alphabet may be provided, or certain letters may be repeated in accordance with their average frequency of occurrence in words.

As shown in Fig. 1, the outline of each inscribed letter on the upper wall surface 3 is provided with a set of three apertures or holes 6 disposed entirely within the outline of the inscribed letter. It will further be observed that the arrangement and spacing of these holes is different for each of the letters.

Some of the movable letter pieces 7 are shown in Figs. 1, 2 and 4 of the drawings. Each letter piece 7 is of uniform thickness and is provided on its lower surface with indexing means in the form of three round studs 10 corresponding in arrangement to the holes 6 of the same inscribed letter on the surface 3. Because the arrangement of the holes 6 and the studs 10 differs for each letter, it is obviously impossible to properly index any letter piece on the wrong letter outline.

As shown in Fig. 1, two letter pieces 7, "E" and "W," are attached to the holder 1 and overlie the corresponding letter outlines 5 on the upper wall 3, the remaining letter outlines being vacant.

The wall portion 4b of the holder 1 is formed with a ledge 11, and the wall portions 4a and 4c are provided with inwardly projecting tabs or supports 12 adapted to cooperate with said ledge to support a card member 13 selected for use. The supports 12 are vertically spaced from the bottom wall 2 to provide the space S for storing additional cards C. The supports 12 most remote from the ledge 11 each have an upstanding flange 12a which serves to retain the selected card 13 in place on the supports 12 with the inner edge of said card supported for its full length by said ledge. The cards may be made of cardboard, metal, plastic or any other suitable material. The bottom wall 2 has a large notch 2a formed in its front edge to enable the player to grasp the cards C and remove them from the storage space S. Each of the cards C carries a pictorial representation of some familiar object, bird or animal, and also the outline of the letters spelling the name thereof. In Fig. 1, the selected card 13 contains an illustration 14 of a bird and the word "Bird" appears adjacent the illustration. The letters 14a of the word have holes 6a corresponding to the stud arrangement on the appropriate letter pieces 7. Three letter pieces 7 consisting of the letters B, I and R are shown in place on the card 13, the outline of the letter D being vacant.

The letter pieces may be of any of the forms shown in Figs. 4, 5 and 6. In the form shown in Fig. 4, the body of the letter piece 7 is solid and flat and the studs 10 project from the lower surface thereof. In the form shown in Fig. 5, the body of the letter 8 is thin and channel-shaped in cross-section and the studs project outwardly from the web portion of the channel. In Fig. 6, the body of letter 9 is thin, flat and surrounded by an inwardly extending marginal flange and the studs project inwardly from the body portion. In the Fig. 5 form, the grooves of the channels follow the shape of the letter, and in the Fig. 6 form, the flange corresponds to the peripheral contour of the letter.

The channelled and flanged forms of the letter pieces have the advantages of making the pieces lighter, conserving material, and of an overall thickness enabling the same to be readily lifted up and handled.

In practicing the invention, the child selects one of the cards and places it on the ledge 11 and supports 12. He notes the picture of the object and also the configuration and arrangement of the letters spelling its name. Then he selects what he considers to be the proper letter piece 7 from the supply on the upper wall 3 and attempts to place it on the proper letter outline. If he has selected the correct letter piece its studs 10 will fit the openings 6a in the letter outline on the card. If he cannot fit the studs 10 of a given letter piece 7 in any sets of the openings 6a of the card, he knows that he has not made the proper letter selection.

In working with the apparatus the child thus learns the spelling of the names of various birds, animals and objects and also the configuration of the letters of the alphabet.

In the modification shown in Fig. 7 of the drawings, the apparatus, in addition to having a holder 1a including the features described above, has also the outlines of the numerals "1" to "10" inclusive, and designated 15. Furthermore, the holder includes a series of cards 16 each having a pictorial representation 17 of a plurality of the same familiar objects, birds or animals thereon, as well as the outline 18 of the number thereof, the name 19, and a series of number pieces 20 for selective attachment to the number outlines 15 on a card. The studs for attaching the number pieces to the cards are the same as that described above for attaching the letter pieces to the cards, although certain of the number pieces 20 have only two studs while others have three or four. The arrangement of the attaching means is such that only the proper number piece 20 can be attached in coincidence with the same number outline 15 on a card.

In Fig. 7, the selected card 13a contains three pictorial illustrations 17 of dogs, an outline of the numeral "3" representing the number of dog illustrations, and outlines of the letters D-O-G-S representing the name of the animals illustrated.

Figure 8:
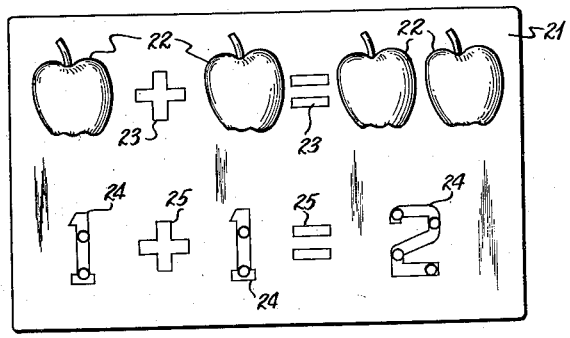
Fig. 8 is a plan view of another type of card to be used with the holder of Fig. 7, and depicting a simple arithmetic problem.

A modification of the cards for use with the holder 1a of Fig. 7 is shown in Fig. 8. In this modification, the card 21 has a pictorial representation 22 of a plurality of the same objects (apples) and the outlines 23 of mathematical symbols (plus and equals signs) forming an equation. The card carries also the outlines 24 of the numbers corresponding to the number of objects illustrated and the outlines 25 of mathematical symbols forming the same equation. The manner of use of the apparatus with this type of card will be obvious without further description. It will also be obvious that a holder (not shown) having only numerals may be used with cards such as the card 21.

By providing a plurality of these apparatuses, several children may compete in a game, the object being to complete the placement of the letter and/or number pieces as soon as possible on any particular card.

It will be understood that various changes may be made in the details of construction of the holder, letter and number pieces, and in the arrangement of the matter on the cards, without departing from the principles of the invention or the scope of the annexed claims.

I claim:

1. An educational apparatus for teaching the correct association of characters with an inscription including corresponding characters, comprising: a holder having a generally flat surface with the outlines of characters inscribed on said surface, said holder having a horizontal bottom wall and opposed upright side walls extending upwardly therefrom to form storage space for a plurality of inscription-bearing cards; movable play pieces corresponding in shape to said inscribed characters, said cards having inscriptions thereon upon which said play pieces are adapted to be superimposed; and means carried by said holder forming a support for one of said cards while in use, said card-supporting means including tabs projecting inwardly from said side walls in vertically spaced relation to said bottom wall.

2. An educational apparatus as defined in claim 1, in which an upright wall interconnects the side walls and forms a rear wall for the card-storage space and wherein said rear wall includes a ledge portion for supporting a card while in use.

3. An educational apparatus for teaching the names of objects and the correct spelling of said names, comprising: a hollow holder of generally flat form having a lower surface and a parallel upper surface spaced from said lower surface, one area of said upper surface having letters of the alphabet inscribed thereon, another area of said upper surface having means for supporting a card while in use and in spaced relation to said lower surface; a series of cards each having thereon a pictorial representation of one or more similar objects and the inscribed name of the object, the space between the card supporting means and said lower surface constituting a storage space for such cards; a series of play pieces corresponding in outline to the letters inscribed on said first-mentioned area of the holder and to the letters of the name of the object inscribed on said cards, and means for attaching said letter pieces to either said holder or said cards in superimposed relation to the corresponding letters inscribed thereon.

4. In an educational apparatus for teaching the correct association of play pieces with indicia, a relatively rigid member having a substantially flat upper surface and having indicia representations outlined on said surface, said member including holes formed within the outlines of each of said representations, said holes being positioned differently within the outlines of each different indicia representation, and play pieces similar in size and shape to said outlines, said play pieces including studs projecting from their undersurfaces in coded relation to holes of the respective indicia representations, whereby each of said play pieces may be attached on said flat surface only when in superimposed relation to the respective character representation, in which relation said studs are received in said holes.

5. An educational apparatus for teaching the correct association of characters with an inscription including corresponding characters, comprising: a holder having a generally flat surface with the outlines of characters inscribed on said surface; movable play pieces corresponding in shape to said inscribed characters; a card having an inscription thereon upon which said play pieces are adapted to be superimposed, said play pieces having studs projecting from the lower side thereof and said inscriptions being apertured to allow said studs to project therethrough; and means carried by said holder forming a support for said card while in use, said card-supporting means being disaligned with said apertures in order not to interfere with said studs, said holder having means forming a space beneath said card-supporting means for storing additional cards.

(References on following page)

References Cited in the file of this patent

UNITED STATES PATENTS

| | | |
|---|---|---|
| 364,845 | Oakley | June 14, 1887 |
| 560,964 | Barnard | May 26, 1896 |
| 1,085,405 | Dadd | Jan. 27, 1914 |
| 1,273,763 | Garman | July 23, 1918 |
| 1,396,379 | Moore | Nov. 8, 1921 |
| 1,593,909 | Paris | June 2, 1925 |
| 2,415,342 | Donner | Feb. 4, 1947 |
| 2,474,447 | Wheelock | June 28, 1949 |
| 2,505,230 | Composto | Apr. 25, 1950 |
| 2,524,548 | Speirs | Oct. 3, 1950 |

FOREIGN PATENTS

| | | |
|---|---|---|
| 645,949 | France | July 9, 1928 |
| 120,368 | Austria | Dec. 27, 1930 |